United States Patent

[11] 3,622,542

| [72] | Inventors | H. Robert Klouman<br>Timonium;<br>Henry Gould, Pikesville, both of Md. |
|---|---|---|
| [21] | Appl. No. | 812,889 |
| [22] | Filed | Apr. 2, 1969 |
| [45] | Patented | Nov. 23, 1971 |
| [73] | Assignee | Alcolac Chemical Corporation<br>Baltimore, Md. |

[54] METHOD OF PRODUCING POLYURETHANES
5 Claims, No Drawings

[52] U.S. Cl. .................................................. 260/77.5 AC,
260/2.5 AC, 260/75 NC
[51] Int. Cl. ...................................................... C08g 22/36,
C08g 22/44
[50] Field of Search ............................................. 260/2.5
AC, 77.5 AC, 75 NC, 584

[56] References Cited
UNITED STATES PATENTS

| 3,219,650 | 11/1965 | Hill................................ | 260/94.3 |
|---|---|---|---|
| 3,248,708 | 2/1969 | Kuryla.......................... | 260/77.5 |

FOREIGN PATENTS

| 243,374 | 5/1960 | Australia...................... | 260/77.5 |
|---|---|---|---|

Primary Examiner—Donald E. Czaja
Assistant Examiner—Eugene C. Rzucidlo
Attorney—Henry B. Kellog ABSTRACT: Polyurethane elastomers and flexible and rigid polyurethane foams of improved physical characteristics are obtained by employing N,N'-tetramethyl-2-hydroxy-1,3-diamino propane as catalyst in reactions involving organic compounds containing one or more hydroxyl groups with organic compounds containing one or more hydroxyl groups with organic compounds containing one or more reactive groups of the formula—NCY in which Y is either oxygen or sulfur.

METHOD OF PRODUCING POLYURETHANES

This invention relates to a method of producing synthetic polyurethane products of improved physical characteristics by employing as the catalyst, N,N'-tetramethyl-2-hydroxy-1,3-diamino propane, in accelerating the reactions of di- or poly-isocyanates or di- or poly-isothiocyanates with a large variety of functional or polyfunctional compounds containing hydroxyl or amino groups having active hydrogen, e.g., water, polyols, polyamines, polyethers, polyesters, poloxy carboxy alkylenes, and the like.

A considerable number of inorganic and organic compounds have been proposed as catalysts for accelerating isocyanate reactions generally and polyurethane preparation in particular. Of the inorganic class, sodium hydroxide, while providing acceleration, leads to uncontrollable reactions, especially in polyurethane foams and brings about excessive cross-linking. The conventional catalysts are of the organic class. Tertiary amines, the more popular catalysts, require elevated temperatures and bring about slow reaction rates unless employed in large amounts, which are both unsatisfactory and undesirable. Moreover, tertiary amines impart an undesirable odor to reaction products of isocyanates with active hydrogen-containing compounds and, due to their basic characteristics, catalyze the degradation of the reaction products or polymers once they are formed. Other disadvantages of certain organic amines heretofore proposed include discoloration, especially yellowing or aging of the reaction product, poor control over the progress of the reaction and a tendency to require the use of high temperature to effect a satisfactory rate of reaction.

The catalysts frequently used in the production of urethanes are N-ethyl morpholine; tetramethyl-1,3-butane diamine; dimethyl ethanolamine; triethylene diamine; and the like. Of these, triethylene diamine is somewhat preferred because it can be used in small concentrations, introduces no troublesome odor problem and permits reactions at practicable and controllable rates. However, its only shortcoming from the price aspect is its relatively high cost.

It is, therefore, the principal object of the present invention to provide a process for the preparation of polyurethane products while employing N,N'-tetramethyl-2-hydroxy-1,3-diamino propane as catalyst in reactions which involve their preparation.

Other objects and advantages will become more clearly manifest from the following specification.

We have found that N,N'-tetramethyl-2-hydroxy-1,3-diamino propane, which can be also named as N,N'-tetramethyl-1,3-diamino-2-propanol, hereinafter referred to for sake of brevity as TMHPD, is a very reactive catalyst in accelerating reactions involving organic compounds containing one or more hydroxyl groups with organic compounds containing one or more reactive groups of the formula-NCY in which Y is either oxygen or sulfur. The reaction rates that are obtainable in accordance with the method of the invention are substantially greater than the rates achieved with the catalysts frequently used. While TMHPD is approximately equal in activity to triethylene diamine, it is much lower in cost and as a consequence may lead to its adoption as the preferred catalyst.

TMHPD demonstrates a highly desirable degree of pot life in the production of urethane elastomers. It is highly effective in both flexible and rigid urethane foam systems. The synergistic action between TMHPD and stannous 2-ethylhexoate is substantially less violent and more readily predictable than combinations of triethylene diamine and the same organic tin salt. Flexible foams generated with TMHPD exhibit improved resiliency and resistance to the "fingernail" test. Because TMHPD has an extended potlife, it permits the user to work "hot" with elastomeric material, providing greater flexibility in scheduling the production operation. In the applications of rigid polyurethane, such as in the manufacture of furniture, it is essential — in fact very important — to obtain hard surfaces which can be readily finished with conventional coatings. TMHPD is exceptionally useful in this respect, producing ideal surfaces when employed as the sole catalyst for molding rigid polyurethane foam furniture. It is also of considerable advantage in pouring filled foams. In short, it can be metered directly into the polyol stream prior to entering the mixing head. As a consequence, the processor can readily and easily adjust the concentration to a fine degree.

TMHPD can be used in small concentrations, generally from 0.005 percent to about 5 percent by weight based on the total weight of the reaction mixture. It will not degrade a urethane polymer after it is formed. It does not introduce any odor problem and permits the reactions at practicable and controllable rates.

TMHPD, which has the following formula:

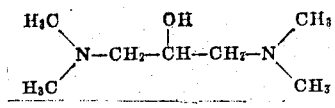

is readily prepared by reacting 1 mole of epichlorohydrin with several moles in excess of dimethylamine (as a 40 percent solution in water) at a temperature between 50°–70°. The chemistry of the reaction is straight forward:

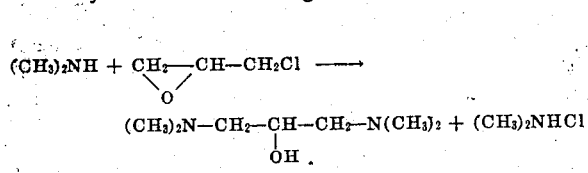

The excess dimethylamine is liberated with excess caustic soda. The excess caustic causes the reaction mixture to separate into two layers. The lower layer is discarded. The upper layer is distilled with rectification to recover unreacted dimethylamine and to yield the final product, i.e. TMHPD of about 98.5 percent purity in the form of a pale liquid.

The finding that TMHPD actually accelerated reactions in the preparation of polyurethanes was first observed by reacting phenyl isocyanate with methanol under identical controlled conditions. As is well-known in the art, this reaction leads to the formation of polyurethanes by the condensation of isocyanates with alcohols and polyoxyalkylene polyols. The tests employing this reaction were carried out by admixing equimolar amounts of phenyl isocyanate and methanol in n-butyl ether solvent, adding a different amine catalyst to the mixture and observing the rate of reaction at 30° C. The catalyst used and relative rates, based on one mole percent of catalyst per mole of isocyanate, that were obtained were as follows:

| Catalyst | Relative Rate |
| --- | --- |
| TMHPD | 10.0 |
| Triethylene diamine | 10.0 |
| Tetramethyl-1,3-butane diamine | 5.0 |
| Dimethylethanolamine | 2.5 |
| N-ethyl morpholine morpholene | 1.5 |

From the foregoing relative rates, it is clearly evident that while TMHPD is equal in activity to triethylene diamine, it is twice as reactive as tetramethyl-1,3-butane diamine, 4 times as reactive as dimethyl ethanolamine, and more than 6 times as reactive as N-ethyl morpholene, catalysts frequently used in the production of urethanes.

Flexible urethane foams can be obtained in accordance with the present invention by first preparing a mixture of the polyol, emulsifier and ancillary reactants such as TMHPD alone or in combination with conventional tertiary amine, such as, for example, N-ethyl morpholine or tin catalysts such as stannous octoate, stannous 2-ethylhexoate, and the like. The mixture is combined with the separate streams of organic polyisocyanates and blowing agent in a conventional continuous foaming machine. The foaming mixture is sprayed or otherwise directed into a suitable mold and allowed to set. The product is cured by standing at ambient temperature for several days or by heating in an oven at about 150° C. for several minutes.

The urethane foams can also be prepared by (1) forming a prepolymer, i.e., prereacting molar equivalents of the polyol (i.e. polyoxyalkylene polyols-polyalkylene ether glycols-) and isocyanate in the absence of water and thereafter producing a foam by the addition of excess isocyanate, TMHPD alone or in admixture with other catalyst, water and surfactant, (2) by the one-shot method in which the hydroxyl compound (aliphatic alcohols containing one or more hydroxy groups, e.g., methanol, ethylene glycol, diethylene glycol, hexamethylene glycol, 1,2,6-hexanetroil, sorbitol and the like, or a polyol), blowing agent and isocyanate reactants are simultaneously mixed together and allowed to react in the presence of TMHPD along or in the aforementioned combination, and (3) by the semi-prepolymer technique wherein the hydroxyl compound is partially extended with excess isocyanate to provide a reaction product containing a high percentage of free isocyanate groups (20–35 percent) which is then foamed at a later stage by reacting with additional hydroxyl compound, blowing agent and TMHPD alone or in the aforementioned combination as catalyst.

Rigid polyurethane foams are obtained by foaming a polyester by either the prepolymer or one-shot technique. As is well known, polyesters are reaction products of polyols with polycarboxylic acids having from 2 to 36 carbon atoms, e.g., oxalic, succinic, maleic, adipic, sebacic, phthalic and dimer acids as those obtained by coupling two molecules of lineoleic acid. The polyesters are also made by a) reacting together an aliphatic polyhydric alcohol (such as trimethylolpropane), b) polycarboxylic acid or mixtures thereof (such as adipic acid and phthalic anhydride), c) long chain unsaturated fatty acids (such as oleic acid), and d) polyhydric polyalkylene ethers having a molecular weight of at least about 400 and in which at least about 50 percent of the alkylene radicals contain at least 3 carbon atoms, such as the various propoxylated trimethylol propanes. The polyester, while employing the one-shot technique, is premixed with TMHPD and an emulsifying agent such as "Silicone X520" a siloxane polyoxyethylene-polyoxypropylene block copolymer containing about 20–25 units of each oxyalkylene moiety, (Union Carbide Corp.). Then an aromatic diisocyanate and blowing agent, such as "-Freon 11" trichloromonofluoromethane are added to the premix and the resulting mixture stirred for about 30 seconds, poured into a mold and allowed to expand. Alternatively this mixture can be foamed as a three component system (polyester premix, aromatic diisocyanate and "Freon 11") in a conventional foaming machine.

It is appreciated by those skilled in this art that the amount of isocyanate used in the preparation of flexible, rigid or semirigid foams should be such that there is more than the theoretical amount required to form a urethane linkage, –NH-CO-O-, in the polymer resulting from the reaction of the isocyanate with the active hydrogens of the hydroxyl containing compound. The amount of the isocyanate employed generally ranges from about 1.0 to 7 equivalents, preferably 2 to 6 equivalents, per equivalent of the hydroxyl compound.

The polyols that are employed in accordance with the process of the present invention are polymers or addition products of alkylene oxides and polyfunctional alcohols. Examples of such alkylene oxides are ethylene oxide, propylene oxide, butylene oxide and mixtures thereof. Examples of polyfunctional alcohols include ethylene glycol, glycerin, trimethylolpropane, hexanetriol, pentaerythritol, and the like. These polyols are prepared in the well known manner so as to have equivalent weights below about 800, preferably between 280 and about 560 and a hydroxyl number of at least 70 and at most 350. The most desirable polyols are the polyoxyalkylene polyols which are liquids and which have an average molecular weight in the range of 500 to 5000. Another class includes polyols which are block copolymers having a continuous chain of one type of oxyalkylene linkage connected to blocks of another type of oxyalkylene linkage. Examples of such block copolymers are reaction products of polypropylene glycols of average molecular weights in the range of 500–5,000 with an amount of ethylene oxide equal to 5–25 percent by weight of the starting polypropylene glycol. Still another class of block copolymers are the reaction products of propylene oxide with polyethylene glycols. A still further class of polyoxyalkylene polyols include polyethylene glycols, polybutylene glycols and copolymers such as polyoxyethyleneoxybutylene glycols and polyoxypropyleneoxybutylene glycols.

As examples of organic isocyanates and polyisocyanates, that are employed in the foregoing reactions and in the method of the present invention, the following are illustrative:

> methyl isocyanate
> ethyl isocyanate
> butyl isocyanate
> octyl isocyanate
> benzyl isocyanate
> phenyl isocyanate
> tolyl isocyanate
> m-phenylene diisocyanate
> 2,4-tolylene diisocyanate
> 2,6-tolylene diisocyanate
> naphthalene-1.5-diisocyanate
> methylene-bis-(4-phenylisocyanate)
> 1,6-hexamethylene diisocyanate
> 4.4'-4''-triphenylmethane triisocyanate
> 1.3,5-benzene triisocyanate polyalkylene polyaryl polyisocyanates such as those disclosed in U.S. Pat. No. 2,683,730 and
> mixtures of those and equivalent materials.

The prepolymers that are employed are the reaction products of an excess of a diisocyanate with a polyol such as trimethylol propane, polyalkylene ether diols of about 400–500 average molecular weight, as well as isocyanate polymers of diisocyanates can be used also in place of the polyisocyanates noted above.

The amount of polyisocyanate or prepolymer that is employed can be varied depending upon the particular characteristics of the urethane elastomer desired. Generally an amount sufficient to provide a ratio of isocyanate groups to hydroxyl groups of at least 0.9:1 should be used, preferably a ratio of NCO:OH of between 1:0:1.

The urethane reaction mixture utilizing the foregoing reactants can be foamed in the presence of the catalyst, TMHPD, by internal development of carbon dioxide or by means of a blowing agent which vaporizes at or below the temperature of the foaming mass. In general, TMHPD is employed in a catalytically significant amount ranging from about 0.005 percent to 5 percent by weight, based on the total weight of the reaction mixture.

As examples of blowing agents, which in an amount up to about 20 parts per 100 parts of polyol control the density of the flexible urethane product, the following are illustrative:
Trichloromonofluoromethane
Dichlorodifluoromethane
Monochlorotrifluoromethane
Trichlorotrifluoroethane
Tetrachlorodifluoroethane
1,1-difluoroethane
1,1,1-trichlorodifluoroethane The reactants employed in the method of the present invention may contain components other than the above mentioned polyols, polyesters, catalyst, prepolymers and blowing agents. Adjuvants such as emulsifiers, pigments, fillers, extenders, fire retardant agents, and the like may be used.

The following examples will illustrate some of the more practical applications of the catalytic method of this invention. The parts are by weight.

UNITED STATES PATENT OFFICE
CERTIFICATE OF CORRECTION

Patent No. 3,622,542                         Dated   - November 23, 1971

Inventor(s)   H. Robert Klouman et al.

It is certified that error appears in the above-identified patent and that said Letters Patent are hereby corrected as shown below:

Insert Columns 5 and 6, as part of Letters Patent 3,622,542.

Signed and Sealed this ninth Day of December 1975

[SEAL]

Attest:

RUTH C. MASON
*Attesting Officer*

C. MARSHALL DANN
*Commissioner of Patents and Trademarks*

EXAMPLE I

A polyester was first prepared by esterifying 1 mol of an adduct of 1 mol of trimethylolpropane and 2.41 mols of ethylene oxide with 0.5 mol of phthalic anhydride at a temperature of 225°–250° C. in nitrogen gas atmosphere. The resulting polyester has a hydroxyl number of 365 and an acid number of 1.6.

In the one-shot technique, 71 parts of the polyester, 0.3 parts of "Silicone X520", a siloxane polyoxyethylene-polyoxypropylene block copolymer containing about 20–25 units of each oxyalkylene moiety, (Union Carbide Corp.) emulsifying agent and 0.3 parts of TMHPD were premixed. To the latter, a premix of 40 parts of an 80–20 commercial mixture of 2,4- and 2,6-tolylene diisocyanates and "Freon 11" (trichloromonofluoromethane) was added. After thorough mixing for about 30 seconds the mixture was poured into a mold and allowed to expand.

The resulting rigid foam was nonfriable and has an excellent hard surface which is easily finished with conventional film coatings.

EXAMPLE II

A mixture was first prepared which consisted of 100 parts of a glycerin initiated polyoxy propylene triol having a hydroxyl number of 168 and an average molecular weight of 1000 and 0.2 parts of stannous 2-ethylhexoate. The resulting mixture was employed to yield a foam by combining it in a conventional three-stream foam machine with a mixture of 4 parts of water, 0.1 part of TMHPD and 2.0 parts of emulsifying agent ("Emulphor EL-719"), an ethylene oxide adduct of castor oil 96% active (GAF. Corporation) and 42.7 parts of an 80–20 mixture of 2,4 and 2,6 tolylene diisocyanates. The machine operated at 25 lbs./minute and the foam was cured for 30 minutes at 157° C.

The physical character of the resulting foam was determined according to the method described in ASTM–D–1564 –59T as follows:

| | |
|---|---|
| Density (lb./cu. ft.) | 2.85 |
| Tensile strength (p.s.i.) | 15.0 |
| Elongation (percent) | 235.0 |
| Tear strength (p.l.i.) | 2.8 |
| Humid Aging | Passed |
| Dry heat aging | Passed |
| Compression Set | |
| 90% 22 hours (percent) | 3.6 |
| Hysteresis (percent) | 65.0 |

The resulting foam had good hydrolytic stability.

It is to be understood that any commercially available emulsifying agent may be used instead of "Emulphor EL-719" that will improve the intermixing of the polyol and polyisocyanate components which are usually mutually insoluble.

EXAMPLE III

Two similar foams were prepared as in example II in which the same proportions of reactants were used but in which 15 parts of trichloromonofluoromethane were added, admixed with the mixed diisocyanate stream, to the foaming mixture and in which 0.1 part of TMHPD was replaced by 0.1 part of catalysts A and B respectively.

Catalyst A consisted of a mixture of 0.1 part of triethylene diamine, 0.2 part of N-ethyl morpholine and 0.3 part of stannous 2-ethylhexoate.

Catalyst B consisted of a mixture of 0.1 part of TMHPD, 0.2 part of N-ethyl morpholine and 0.3 part of stannous 2-ethylhexoate.

These two foams were cured for 1 hour at 157° C. Their physical characteristics are given in the following table 1:

TABLE 1

| | Catalyst | |
|---|---|---|
| | A | B |
| Density (lb./cu.ft.) | 1.55 | 1.53 |
| Tensile strength (p.s.i.) | 15.0 | 15.0 |
| Elongation (percent) | 225 | 210 |
| Tear strength (p.l.i.) | 3.0 | 2.9 |
| Humid aging | Passed | passed |
| Dry Heat aging | Passed | Passed |
| Compression Set | | |
| 90% 22 hours (percent) | 5.1 | 2.1 |
| Hysteresis (percent) | 29 | 28 |
| Ball rebound (percent) | 50 | 51 |
| Indentation load at | | |
| 25% | 26 | 23 |
| 65% | 48 | 47 |

Both of these foams possessed good hydrolytic stability.

We claim:

1. The method for producing polyurethanes which comprises reacting an organic compound containing at least one reactive isocyanate group with an organic compound containing at least one hydroxyl group in the presence of a catalytic amount of N,N'-tetramethyl-2-hydroxy-1,3-diamino propane.

2. The method for producing polyurethanes which comprises reacting a polyoxyalkylene polyol with an organic compound containing at least one reactive isocyanate group in the presence of a catalytic amount of N,N'-tetramethyl-2-hydroxy-1,3-diamino propane.

3. The method according to claim 1 wherein the organic compound containing at least one reactive isocyanate group is an aromatic diisocyanate.

4. The method according to claim 3 wherein the aromatic diisocyanate is at least one diisocyanate selected from the class consisting of 2,4-tolylene diisocyanate and 2,6-tolylene diisocyanate.

5. The method according to claim 4 wherein the aromatic diisocyanate is 2,4-tolylene diisocyanate.

* * * * *